United States Patent [19]

Hancock

[11] Patent Number: 4,931,801
[45] Date of Patent: Jun. 5, 1990

[54] METHOD AND APPARATUS TO SCAN CONVERT RADAR VIDEO TO TELEVISION OUTPUTS

[75] Inventor: William R. Hancock, Phoenix, Ariz.

[73] Assignee: Honeywell Inc., Minneapolis, Minn.

[21] Appl. No.: 342,352

[22] Filed: Apr. 24, 1989

[51] Int. Cl.$^5$ .............................................. G01S 7/298
[52] U.S. Cl. ..................................... 342/185; 358/140
[58] Field of Search ......................... 342/185; 358/140

[56] References Cited

U.S. PATENT DOCUMENTS

| | | | |
|---|---|---|---|
| 4,220,969 | 9/1980 | Nitadori | 342/185 X |
| 4,275,415 | 6/1981 | Engle | 342/185 X |
| 4,434,437 | 2/1984 | Strolle et al. | 342/185 X |
| 4,656,467 | 4/1987 | Strolle | 342/185 X |

Primary Examiner—Gilberto Barrón, Jr.
Attorney, Agent, or Firm—Haugen and Nikolai

[57] ABSTRACT

A method and apparatus for converting polar format radar video data into a horizontal raster format output to a TV monitor. Radar video data comprises radar video pixels each having an associated intensity value and a polar coordinate in a raster display. The TV monitor includes a display screen including a plurality of pixels wherein each pixel has a corresponding X,Y address. The apparatus and method of the invention comprises steps or apparatus for storing the radar video pixels, translating X,Y addresses into corresponding angular and radial coordinates, scanning the storage means using the translated X,Y address and interpolating a radar intensity value for the translated X,Y address. The radar video pixels are indexed by radial and angular coordinates. The scanning process includes accessing at least four radar video pixels surrounding the translated X,Y address. In the preferred embodiment of the invention, the scan conversion of the X,Y addresses is accomplished in a seven stage scan converter pipeline.

9 Claims, 4 Drawing Sheets

METHOD AND APPARATUS TO SCAN CONVERT RADAR VIDEO TO TELEVISION OUTPUTS

BACKGROUND OF THE INVENTION

The invention is directed generally to the field of avionics displays and, more particularly, to a method and apparatus to scan convert radar video from a polar sweep format into a horizontal raster format to achieve compatibility with a standard TV monitor.

Modern aircraft, and in particular, military aircraft, include a variety of display devices which are installed in the cockpit in order to provide information to the crew in a way which eases the crew workload. Such systems may include airborne digital map systems which are used on board various aircrafts for purposes of displaying aeronautical charts and other data such as navigational information. In other cockpit environments, radar information may be similarly displayed. FIG. 1 shows an avionic's suite of the type used on a modern aircraft including a heads up display 12, a left multifunction display (MFD) 14, a right MFD 16, mission computer 20, data bus 22, display computer 18, radar set 26 with associated discrete inputs 24 and radar graphics generator 10. In such systems, the mission computer 20 controls the functions of the display computer, graphics generator and radar set. The radar set accepts discrete inputs and provides outputs including video and serial digital data into the radar graphics generator which, in turn, sends the radar video to the display computer 18 for further processing and eventual display to the pilot via one of the display units. The key function of the radar graphics generator 10 is to convert the radar video outputs on lines 27a and 27b into the proper format required by the display computer 18. In one such system, the radar video outputs have a raster pattern of 675 lines with an update rate of 30/60 and must be converted into a 525 30/60 format. The primary source of control data is received by the radar graphics generator from the mission computer over bus 22 which may be, for example, a 1553B multiplexing bus. The mission computer communicates with and controls all the subsystems on the bus 22. The radar graphics generator receives mode information, radar attributes, and symbology insertion commands in the form of display macros. There are two primary links between the radar set 26 and the radar graphics generator. These links are the analog video carried on line 27a and the serial digital data transmitted on line 27B. In one known system, the analog interface transmits the radar video over a single triax cable. The video arrives in an RS-343 format comprising 512 active lines of the 675 line total. The radar video is transmitted in either a sector scan mode, or a back-and-forth orthogonal scan (B-Scan) patch raster. The sector scan modes require conversion from a polar format to a normal orthogonal raster, while the B-Scan is already orthogonal and only needs to be changed to a normal retrace raster presentation. The sector scan modes and B-Scan modes both require rotation prior to input into the display computer. The radar transmits digital target data to the radar graphics generator over a redundant bus consisting of six twisted pair leads. The interface consists of two mode lines, one megahertz clock line and the actual data line. The digital data and clock lines are repeated such that the digital data transmissions are redundantly received. The digital data messages are then converted into symbology and inserted into the radar video.

Typically included in the radar graphics generator 10 is a video scan converter. Current methods and apparatus scan convert radar data while the data is incoming. The radar data is then stored into a full field memory with X,Y addressing. This requires multiple writes of each radial or arc with slightly differing coordinates to prevent the occurrence of pixel "holes" where pixel holes are voids caused by missed X,Y coordinates during scan conversion. Besides the potential "holes" which are especially prevalent during zoom modes, current methods have problems accurately zooming and compressing the radar data. Also, in known apparatus, during scan conversions near the origin, multiple radar pixels can intersect an individual pixel.

The invention provided has advantages over the prior art which are achieved by storing the radar data indexed by radius and angle. Thus, in the full field memory there are no cases of "holes" or multiple writes to a single pixel. During the readout phase a high speed hardware pipeline performs the necessary warping from polar to cartesian coordinates, rotation and scaling. The pipeline utilizes bi-linear interpolation to ensure optimum display fidelity. Thus, the invention solves the difficult problems of missing pixels at the edges of the radar area and also prevents the loss of data near the origin due to multiple writes of pixels by different radials or arcs. The invention provides more accuracy especially in the area near the origin. The warping, rotation and scaling function are performed in real time by a much simpler pipeline than those available in the prior art. The pipeline must solve an inverse tangent function and solve the square root of the sum of X*X and Y*Y. Known pipeline processor method which solve these equations require as many as 12 steps and deliver insufficient accuracy for radar conversion applications. The method and apparatus of the invention require only seven steps including three steps for accessing the data and performing bi-linear interpolation.

SUMMARY OF THE INVENTION

A method and apparatus for converting polar format radar video data into a horizontal raster format output to a TV monitor is disclosed. Radar video data comprises radar video pixels each having an associated intensity value and a polar coordinate in a raster display. The TV monitor includes a display screen including a plurality of pixels wherein each pixel has a corresponding X,Y address. The apparatus and method of the invention comprises steps or means for storing the radar video pixels, translating X,Y addresses into corresponding angular and radial coordinates, scanning the storage means using the translated X,Y address and interpolating a radar intensity value for the translated X,Y address. The radar video pixels are indexed by radial and angular coordinates. The scanning process includes accessing at least four radar video pixels surrounding the translated X,Y address.

In the preferred embodiment of the invention, the scan conversion of the X,Y addresses is accomplished in a seven stage scan converter pipeline.

It is one object of the invention to provide a video scan converter for processing radar data stored in a full field memory resulting in an output intensity value every pixel clock time.

It is yet another object of the invention to perform scan conversion for multiple scanning modes of a radar set.

It is yet another object of the invention to provide an apparatus for converting any polar format video data into a horizontal raster format output to a TV monitor wherein the conversion is accomplished in a seven-stage scan converter pipeline.

Other objects, features and advantages of the invention will become apparent to those skilled in the art through the description of the preferred embodiment, claims and drawings herein wherein like numerals refer to like elements.

DESCRIPTION OF THE PREFERRED EMBODIMENT

Figure 1:
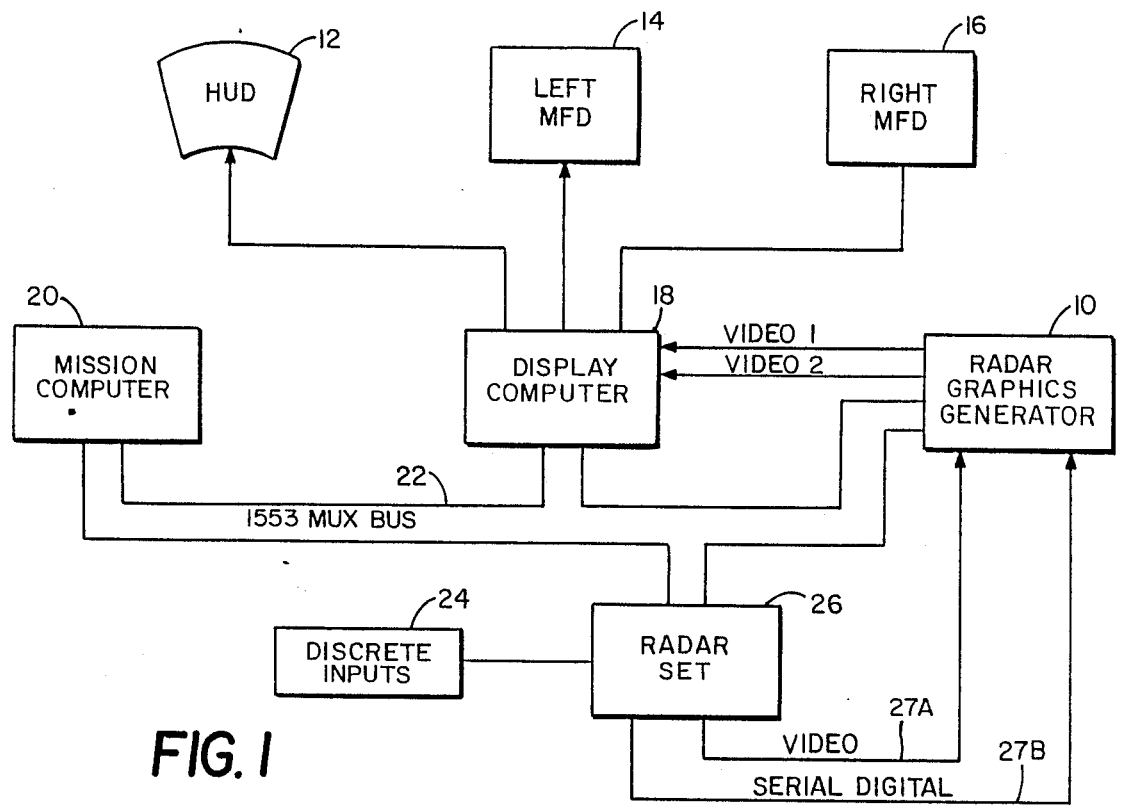
FIG. 1 is a block diagram of a typical avionics suite incorporating the method and apparatus of the invention.
Figure 2:
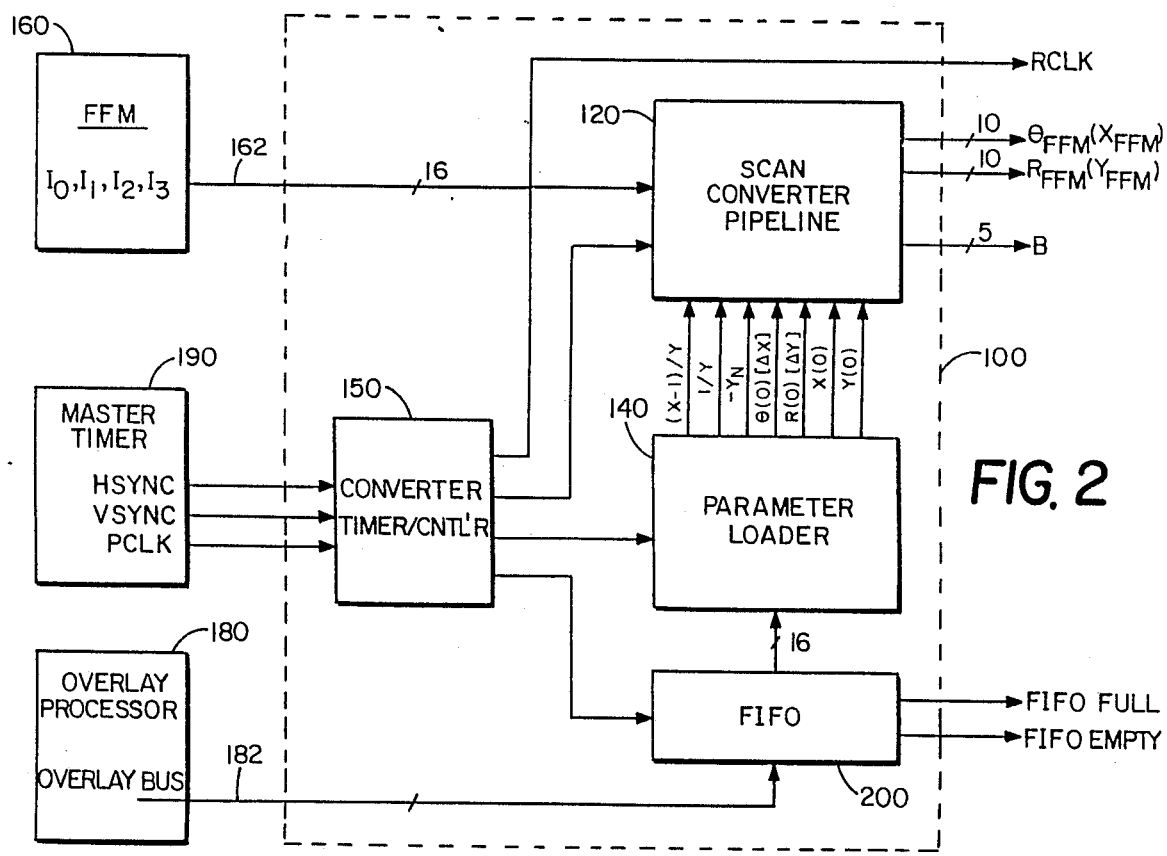
FIG. 2 is a block diagram of a video scan converter including the arc scan converter pipeline of the invention.

Referring now to FIG. 2, a functional block diagram of the video scan converter apparatus of the invention is shown as employed in an avionics display application. The video scan converter apparatus of the invention is denoted by the dotted line 100 and functionally comprises a scan converter pipeline 120, parameter loader 140, a converter time/controller 150, and a first in, first out memory buffer (FIFO) 200. The video scan converter has inputs connected to a display full field memory (FFM) 160 and a system overlay processor 180. It is believed that the full field memory 160, master timer 190, overlay processor 180, converter timer controller 150, and FIFO 200 are comprised of conventional circuits which are implemented by apparatus or methods well known in the art. The converter 150 accepts inputs from the display computer including the horizontal sync (HSYNC), vertical sync (VSYNC) and pixel clock (PCLK) for use in timing and controlling the video scan converter 100. The scan converter pipeline 120 accepts intensity values from the full field memory 160 on input bus 162. These intensity values are represented by $I_0$, $I_1$, $I_2$, and $I_3$ and further represent the four intensities surrounding a desired readout point (at coordinates R, Theta). The video scan converter must convert the X,Y addresses for each pixel into the addresses required by the full field memory after performing coordinate transformations, rotation and compression. The data thus retrieved from the full field memory must then be routed through a bi-linear interpolator to get the best approximation to the desired intensity for that point. As provided by the invention, the whole process is performed in real time such that a new pixel data point becomes available each pixel clock time. In one embodiment of the invention the pixel clock period is about 109 nanoseconds for a standard 525 line 30/60 raster display.

In one embodiment of the invention, the process needed to perform the coordinate transformation and bi-linear interpolation is contained within a seven step scan converter pipeline 120 for sector scan modes and a four step scan converter pipeline for the B-Scan mode. The basic algorithms that must be solved for the scan converter pipeline are as follows:

Sector Scan: $R = \text{Radius} - \text{Compression}*SQRT(X2 + Y2)$
Theta = 
$\text{Comp2}*(\text{Max Theta} - \text{inverse } TAN(X/Y))$ B-Scan: $X' = \text{Compression}*(X*\cos(\text{Angle}) - (Y*\sin(\text{Angle})))$
$Y' = \text{Compression}*(Y*\cos(\text{Angle}) + (X*\sin(\text{Angle})))$ Bi-Linear: $B_1 = I_0 + (I_1 - I_0)*Fx$
$B_2 = I_2 + (I_3 - I_2)*Fx$
Intensity $= B_1 + (B_2 - B_1)*Fy$ Where "Compression" is the linear compression factor, Comp2 is the angular compression factor, X,Y are pixel distances to the radar origin, "Radius" is from the origin to the furthest arc, Max Theta is the angle of the left hand side of the sector scan, "Angle" is the rotation angle, and $I_0$, $I_1$, $I_2$, and $I_3$ are the four intensities surrounding the desired readout point (at coordinates R,Theta or X',Y'). The final intensity output will be displayed at the starting X,Y coordinate.

The conversion process does not solve these equations explicitly. Instead an incremental solution is produced, such that a previous point's intermediate data is utilized for finding the next point's solution. The Overlay Processor is required to furnish initialization data for each readout line to startup these intermediate computations. The line data FIFO permits the processor to preload multiple lines asynchronously, and then update the FIFO as needed. An interrupt line informs the processor that 15 the FIFO is almost empty. The full field memory 169 is set up to return the intensities of all four points required per address access in parallel. A master timer 190 generates the timing signals which are used to synchronize the startup and running of the conversion pipeline. The final output of the scan converter pipeline comprises 5 bit intensities "B" for each pixel as the master timer requests that location.

At the heart of the scan converter 100 is a hardware implemented Scan Conversion Pipeline 120. With the Overlay Processor providing initialization parameters, the scan conversion pipeline provides processing for coordinate transformation, rotation and compression. The scan conversion pipeline, in conjunction with the Overlay Processor performs the scan conversion for the radar's Sector Scan Mode's, and B-Scan Mode.

In one example of an embodiment of the invention, the Sector Scan raster is stored in the FFM 160 as 512 angular by 512 radial 4-bit intensity data points. The 512 angular points cover 120 degrees centered around the display center for the normal Sector Scan Mode. In the high resolution, Spotlight Scan Mode, the 512 angular points cover a 45 degree scan contained within $+/-60$ degrees from the display center. For both sector scan modes, the radar's polar raster stored in the FFMs is converted to an X,Y raster format required by the display computer. Two high level functions must be performed by the conversion hardware in real time for each displayed pixel. First, orthogonal-to-polar address conversion in performed to obtain the proper FFM address for the pixel. Second, bi-linear interpolation on four pixel intensities is performed to obtain the displayed intensity. The specific numerical parameters discussed herein will be understood to be used by way of illustration and not a limitation of the invention.

Figure 3:
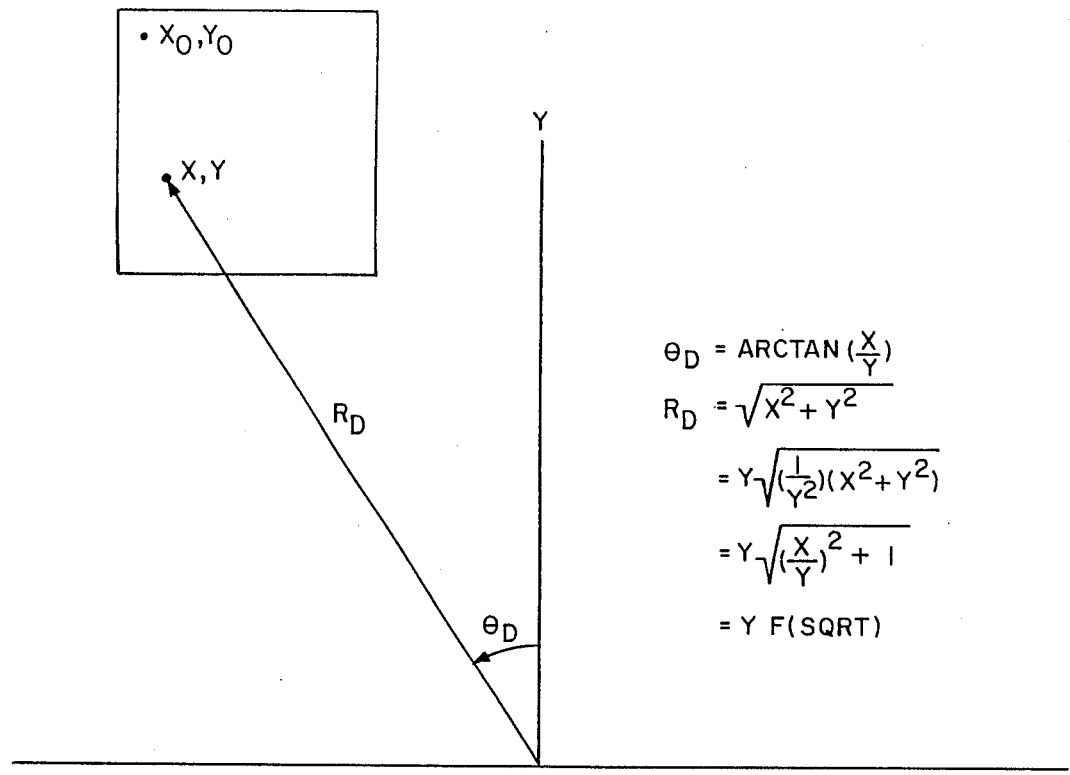
FIG. 3 illustrates the display coordinate system employed by one embodiment of the invention.

The transformations are implemented using a proven algorithm developed in software for a demonstration program created by Honeywell, Inc., Defense Systems Division, Albuquerque, New Mexico. The algorithm is implemented in a hardware pipeline for the sector scan conversions. First, the X,Y coordinates are converted into angular, radial coordinates. The angle is simply the arc tangent of (X/Y). The radius calculation is rewritten to also be a function of (X,Y). The equation will be explained in the hardware description of the pipeline. The display coordinate system as employed by the invention is shown in FIG. 3.

Translation into the FFM coordinate system takes two steps. First, scale factor adjustments must take place as follows:

$$R_R = SF_R \times R_D$$
$$= SF_R \times \sqrt{X^2 + Y^2}$$
$$= SF_R \times Y \times \sqrt{1 + \frac{X^2}{Y^2}}$$
$$= SF_R \times Y \times F(SQRT)$$
$$= Y_N \times F(SQRT) \text{ where } Y_N = SF_R \times Y$$
$$\Phi_R = SF_\Phi \times \Phi_D$$

$\Theta_r = SF_\Theta \times \Theta_D$ where $SF_R$ and $SF_\Theta$ are the radial and angular display-to-radar coordinate scale of composition factors.

Figure 6:
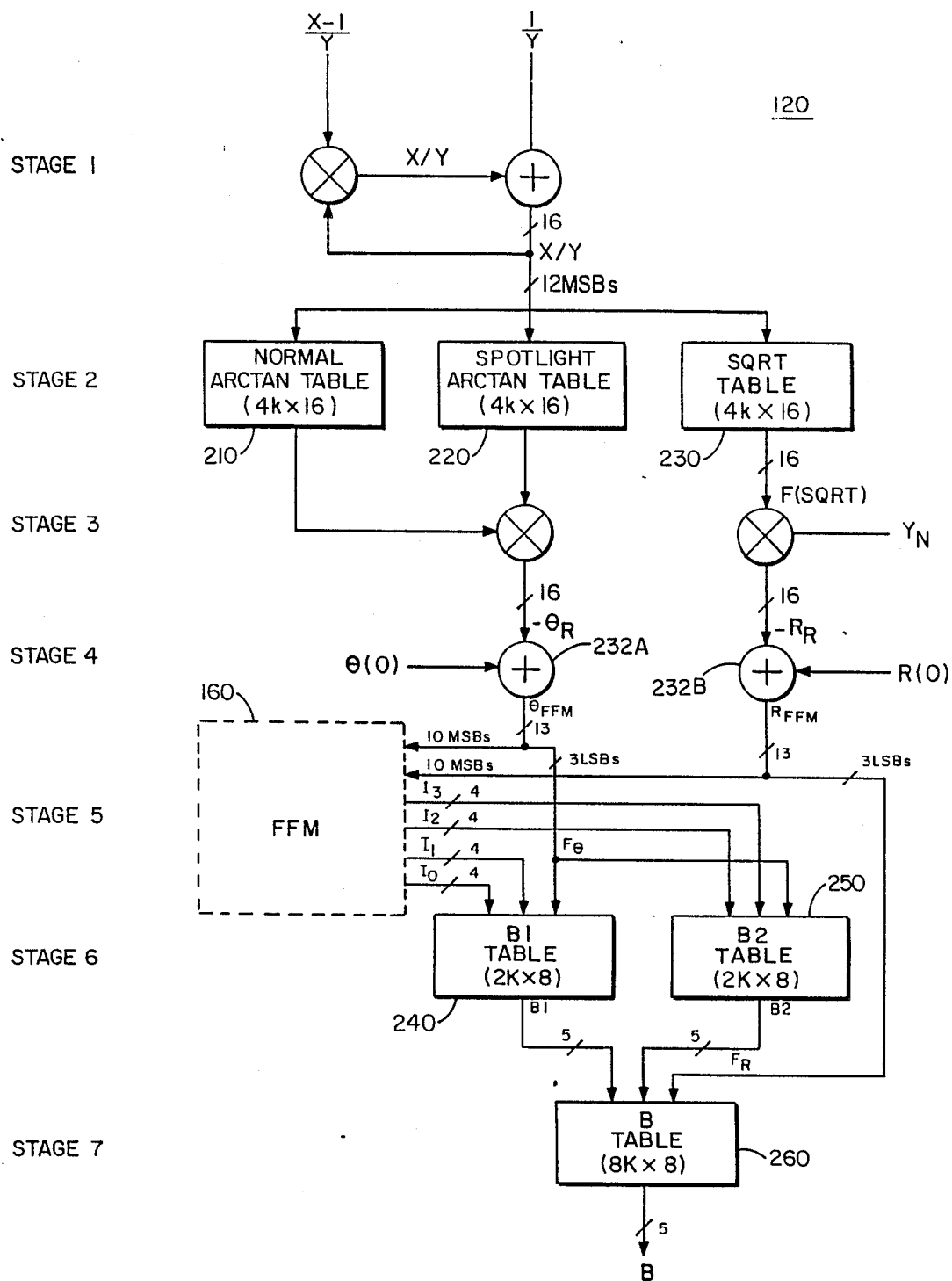
FIG. 6 is a schematic functional diagram of the arc scan converter pipeline of the invention.

Referring now to FIG. 6, a detailed flow chart of one example of an embodiment of the scan conversion pipeline 120 of the invention is shown. The pipeline consists of seven stages and includes only one (1) fixed-point multiplier and three (3) fixed-point adders. Maximum use is advantageously made of table look-ups with the pipeline of this example utilizing six (6) look-up tables.

Stage 1

Stage 1 of the pipeline accomplishes an X/Y calculation and addition. Instead of the pipeline calculating a new X divided by Y each pixel time, the pipeline avoids division and requires only a simple addition at the start of the pipeline by operating on (X/Y) and (1/Y). For a given line, $$X_{N+1} = X_N + 1$$
$$Y_{N+1} = Y_N$$

Note: Y is a constant for a given line. Therefore, $$(X/Y)_{N+1} = (X_N + 1)/Y$$
$$= (X/Y)_N + 1/Y$$

So to calculate the new (X/Y), the pipeline simply adds the constant (1/Y) to the old (X/Y). At the start of each line scan, the pipeline is loaded with a new (1/Y) and an initial (X/Y) equal to ((X−1)/Y). ((X−1)/Y) is required to initialize the pipeline to result in the correct (X/Y) for the first pixel in the line scan after the processing by the first stage of the pipeline. (X/Y) and (1/Y) use fixed point two's complement 16 bit representations. Since any pixel is contained within +/−60 degrees, X/Y is limited to a range of:

$$\text{Arctan}(-60) < X/Y < \text{Arctan}(+60)$$
$$(-1.7) < X/Y < (+1.7)$$

(X/Y) and (1/Y) are scaled into −2.0 to +2.0 range.

Stage 2 ($\Theta_D$, F (SQRT)) : TABLE LOOK-UP

The (X/Y) calculated by Stage 1 of the pipeline is fed into look-up tables 210, 220 and 230 to obtain $\Theta_D$ and the F(SQRT) portion of $R_D$. The SQRT Table is a 4K×16 bit table. As described above, the function performed by the SQRT Table is:

$$F(SQRT) = SQRT[(X/Y)^2 + 1]$$

Multiplication of the scale factor for $\Theta_D$ in the next stage of the pipeline is eliminated by calculating $SF_\Theta$ into the ARCTAN Table. Additionally, the data is complemented where the actual output of the ARCTAN Table is $-\Theta_R$. Since the scale factor is different between the Normal Scan Mode and the Spotlight Scan Mode, an ARCTAN look-up table was required for each mode. The two (2) ARCTAN Tables are also 4K×16 bits each.

Stage 3 (Scale Factor Adjust: MULTIPLY)

The scale factors account for:
(a) raster format differences between the radar active 512×512 format and the display active 480×480 format;
(b) differences in fixed binary representation LSB values in hardware implementation of the invention; and
(c) sector scan differences between, for example, the full mode 120 degree scan and the Spotlight Mode 45 degree scan.

An offset equivalent is added to the location of the first polar pixel to both the radial and angular values to yield the values concatenated to form the FFM address of the desired pixel (upper, left corner of radar FFM).

$$R_{FFM} = R(0) - R_R$$
$$\Theta_{FFM} = \Theta(0) - \Theta_R$$

where $\Theta(0)$, $R(0)$ are the coordinate of the first polar pixel.

The address is actually the concatenation of the MSBs of $\Theta_{FFM}, R_{FFM}$. The LSBs define the sub-pixel location of the final desired intensity.

Figure 4:
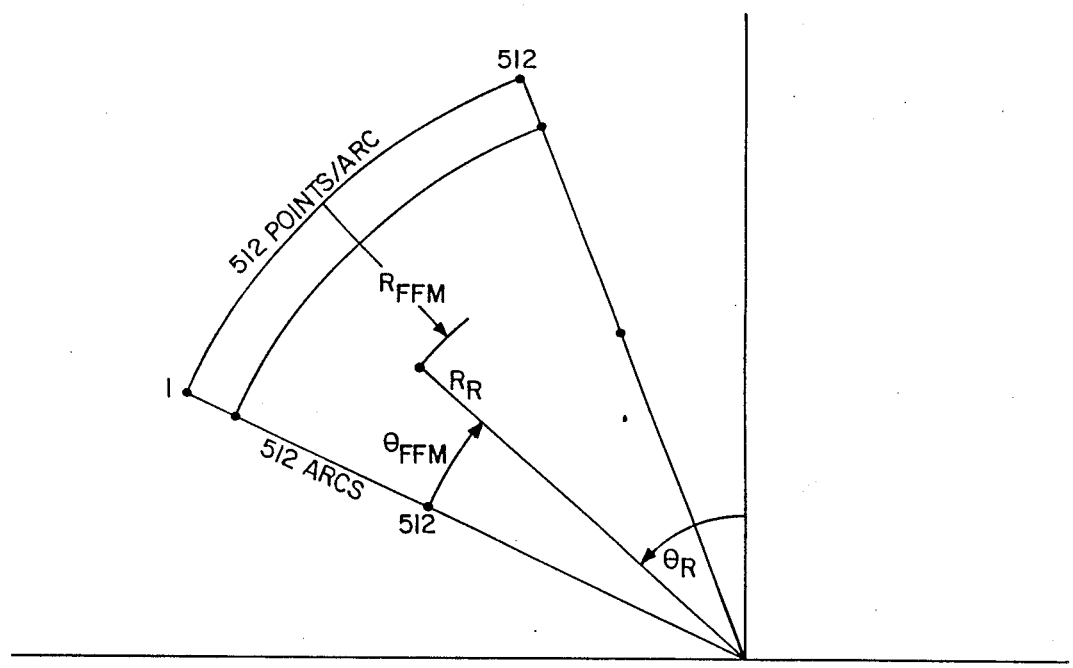
FIG. 4 illustrates the radar arc scan coordinate system as employed by one embodiment of the invention.
Figure 5:
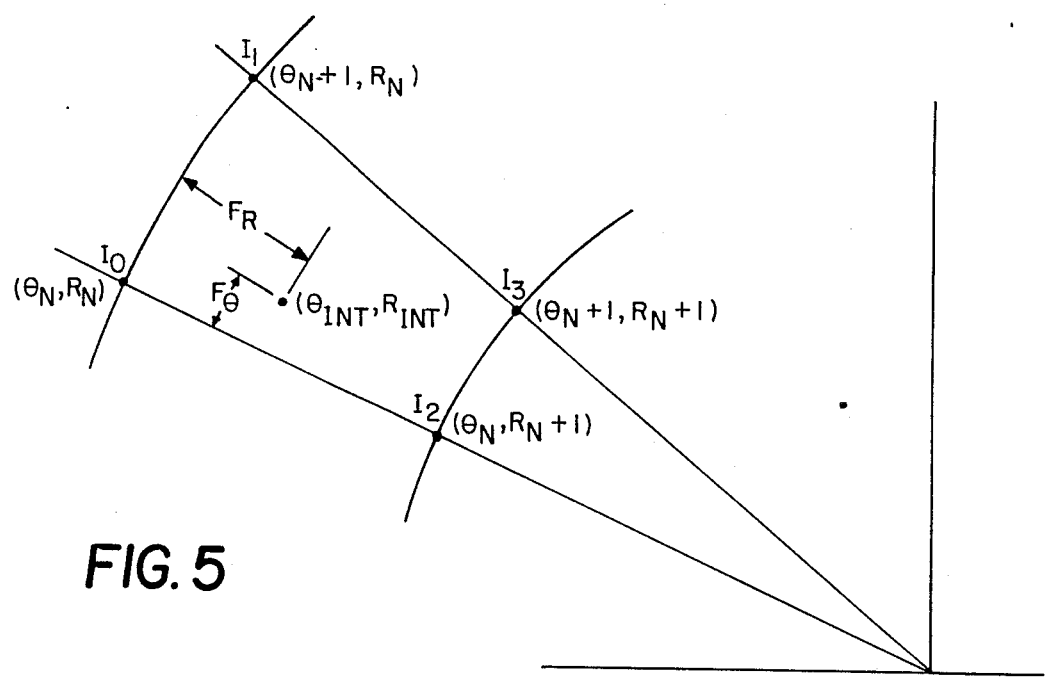
FIG. 5 illustrates a method of luminance intensity interpolation as employed by one embodiment of the invention.

The display X,Y coordinate having been translated into the FFM $\Theta_{FFM}, R_{FFM}$ coordinate as shown in FIG. 4, bi-linear interpolation is next performed on the intensities of the four surrounding pixels to achieve the desired intensity to be displayed. Referring to FIG. 5, pixel $\Theta_N, R_N$ is defined by the 10 MSBs of $\Theta_{FFM}, R_{FFM}$. $F_\Theta$ and $F_R$ are the fractional portion of the FFM coordinates and are defined by the 3 LSBs of $\Theta_{FFM}$, and $R_{FFM}$, respectively. The equations for bi-linear interpolation of the intensities are:

$$B_1 = I_0 + (I_1 - I_0) \times F_\Theta$$

$$B_2 = I_2 + (I_3 - I_2) \times F_\Theta$$

$$B = B_1 + (B_2 - B_1) \times F_R$$

where $I_0$ through $I_3$ are the intensities of the four surrounding pixels and B is the intensity output to the Video Generator Card.

Because the ARCTAN Tables of the previous stage performed the scaling for $\Theta_D$ and actually provided $-\Theta_R$, no processing is performed on the angular component in Stage 3. The parameter $-\Theta_R$ only requires storage to maintain proper phase with the correct radial component. To obtain $R_R$, the output of the SQRT Table must be multiplied by $Y_N$. $-Y_N$ is the third parameter provided to the pipeline at the start of each line scan. (Because $Y_N$ is a function of Y, $Y_N$ could not be incorporated into the SQRT Table to avoid the required multiplication of Stage 3.) The multiplication results in the calculation of $-R_R$.

Stage 4 ($\Theta_{FFM}, R_{FFM}$: ADDITION)

Before radar data can be accessed from the FFM, offsets must be added to obtain $\Theta_{FFM}$ and $R_{FFM}$. The offsets $\Theta(0)$ and $R(0)$, which are the coordinates of the first pixel in the polar raster, are provided to the pipeline at the beginning of each frame. In parallel addition, $\Theta(0)$ and $R(0)$ are added to $-\Theta_R$ and $-R_R$, respectively by addition apparatus 232A and 232B.

Stage 5 ($I_0$ through $I_3$: FFM RETRIEVAL)

The $\Theta_{FFM}$ and $R_{FFM}$ provided by the previous stage are each formatted as fixed point two's complement 13-bit representations. The ten (10) MSBs of each are provided as an address input to the FFM. The FFM provides four intensities ($I_0$ through $I_3$) of the four surrounding pixels to be used by the next stage of the pipeline. The FFM coordinates are scaled to cause a negative value to result on the address components if the calculated pixel address exceeds the range of the radar FFM data base. The FFM returns a zero intensity level for pixel outside of the FFM data base range. The lower 3 bits of $\Theta_{FFM}$ and $R_{FFM}$ are stored to maintain proper pipeline phasing and are utilized by the following stages of the pipeline.

Stage 6 ($B_1, B_2$: TABLE LOOK-UP)

Stage 6 performs the first step of the bi-linear interpolation utilizing two table look-ups. The $B_1$ and $B_2$ look-up tables 240 and 250 in this example embodiment are $2K \times 6$ bits each. The $B_1$ table receives the $I_0$ and $I_1$ intensities, comprising 4 bits each, and the 3 LSBs of $\Theta_{FFM}$ ($F_\Theta$), and outputs a 5 bit value for $B_1$. The $B_2$ table receives the $I_2$ and $I_3$ intensities comprising, 4 bits each, and the 3 bit LSBs of $\Theta_{FFM}$ ($F_\Theta$) and outputs a 5 bit value for $B_2$. To provide proper data phasing, storage must be provided for $F_R$ during this stage.

Stage 7 (B: TABLE LOOK-UP)

Stage 7 performs the second and final step in the bi-linear interpolation resulting in the intensity sent to external electronics (not shown) for generating the display. The B look-up table 260 in this example is $8K \times 8$ bits. The $B_1$, $B_2$ values obtained in the previous stage along with the 3 LSBs of $R_{FFM}$ ($F_R$) are provided as inputs to the table.

B-Scan Pipeline

In the process of storing the back and forth radar B-Scan sweep into FFM, the FFM increments and decrements the x-axis address accordingly, resulting in the radar data appearing as a normal orthogonal raster with $512 \times 512$ active pixels stored in the FFM. Therefore, the only processing required by the hardware pipeline is rotation and scale factor adjustment of the FFM data base. The scale factor equation is simply:

$$X_{FFM} = SF_B \times X_D$$

$Y_{FFM} = SF_B \times Y_D$ where $X_D, Y_D$ is the display pixel coordinate and $SF_B$ is the display to B-Scan coordinate system scale factor. Instead of incrementing $X_D$ by 1 and maintaining $Y_D$ constant during a line scan, rotation of the B-Scan data is achieved by incrementing the coordinates accordingly:

$$(X_D)_{N+1} = (X_D)_N + \cos(\Theta)$$

$(Y_D)_{N+1} = (Y_D)_N + \sin(\Theta)$ where $\Theta$ is the angle of rotation. Therefore, $$\begin{aligned}(X_{FFM})_{N+1} &= (X_{FFM})_N + SF_B \times \cos(\Phi) \\ &= (X_{FFM})_N + \text{delta } x \\ (Y_{FFM})_{N+1} &= (Y_{FFM})_N + (SF_B \times \sin(\Phi)) \\ &= (Y_{FFM})_N + \text{delta } y\end{aligned}$$

Figure 7:
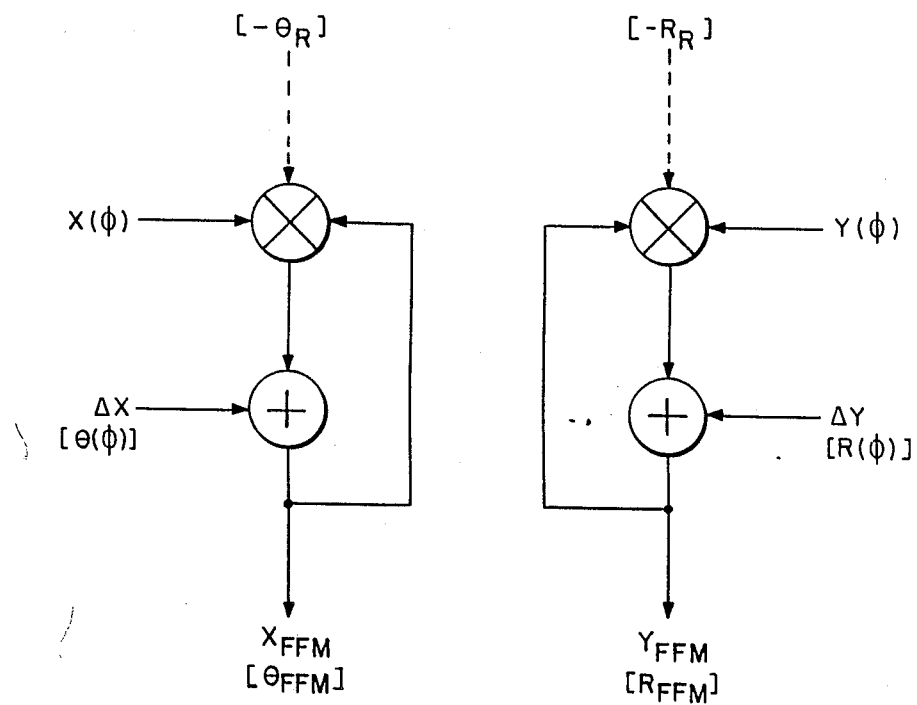
FIG. 7 is a functional diagram of a modification to the arc scan converter pipeline of FIG. 6 to accommodate B-Scan mode.

FIG. 7 shows the modification to the sector scan pipeline to accommodate the B-Scan Mode. An additional multiplexer 300 is added to the pipeline in front of each Stage 4 adder 232. X(0) and Y(0) are provided to the pipeline for each scan line to initialize the pipeline, while delta x and delta y are provided on a frame basis. As in the sector scan mode, the 10 MSBs of $X_{FFM}$ and $Y_{FFM}$ are utilized for the FFM 160 address while the 3 LSBs of each are utilized in the downstream stages of the pipeline for bi-linear interpolation.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself. For example, instead of using a $2 \times 2$ matrix of points for interpolation, one could access an $N \times N$ matrix from FFM where N is any integer. In such a case, one would use a curve fitting algorithm in order to generate the desired display intensities. One popular curve fitting algorithm which may be used is cubic spline interpolation.

What is claimed is:

1. Apparatus for converting polar format radar video data comprising radar video pixels each having an associated intensity value in a polar raster display into a horizontal raster format output to a TV monitor, wherein the TV monitor includes a display screen including a plurality of pixels and a plurality of scan lines and wherein each pixel has a corresponding X,Y address, wherein the apparatus comprises:

(a) means for storing the radar video pixels indexed by radial and angular coordinates;

(b) means for translating a display X,Y address into corresponding angular and radial coordinates wherein the translating means further comprises:

(i) means for addition by operating on (X/Y) and (1/Y) wherein for each successive scan line the constant (1/Y) is added to the previous (X/Y) to calculate a new (X/Y) and further wherein at the start of each scan line the translating means is loaded with a new (1/Y) and ((X−1)/Y), (ii) means for providing the square root of $[(X/Y)^2+1]$ so as to yield $R_R$, (iii) means for providing and scaling the arc tangent of (X,Y) so as to yield $\Theta_R$, (iv) means for multiplying $R_R$ by a scaling factor $Y_N$ to obtain $-R_R$, (v) means for adding offsets to $-\Theta_R$ and $-R_R$ wherein the offsets are the coordinates of the first pixel in the polar raster so as to provide $\Theta_{FFM}$ and $R_{FFM}$ values, and (vi) means for formatting the $\Theta_{FFM}$ and $R_{FFM}$ values as fixed point two's complement 13-bit representations wherein the 10 MSBs of each are provided as an address input to the storage means and the lower 3 bits are stored to maintain proper pipeline phasing;

(c) means for scanning the storage means using the translated X,Y address to access at least four radar video pixels surrounding the translated X,Y address; and (d) means for interpolation of a radar intensity value for the translated X,Y address as a function of the intensity values associated with the surrounding pixels.

2. The apparatus of claim 1 modified for B-Scan operation wherein first and second additional multiplexers are added between the multiplying means and the offset adding means wherein X(0) and Y(0) are provided to the first and second multiplexers respectively for each scan line and delta x and delta y are provided on a frame basis where delta x=$SF_B$*COS($\Theta$), delta y=$SF_B$*SIN($\Theta$), $\Theta$ is the angle of rotation, and $SF_B$ is the display-to-radar coordinate scale factor.

3. The apparatus of claim 1 wherein the means for interpolation further comprises means for performing bi-linear interpolation where the equation for bi-linear interpolation of the intensity values are:

$B_1 = I_0 + (I_1-I_0) \times F_\Theta$ $B_2 = I_2 + (I_3-I_2) \times F_\Theta$ $B = B_1 + (B_2-B_1) \times F_R$ where $F_\Theta$ and $F_R$ are the fractional portion of the FFM coordinates and are defined by the 3 LSBs of $O_{FFM}$ and $R_{FFM}$ respectively, $I_0$ through $I_3$ are the intensities of the four surrounding pixels and B is the intensity output.

4. The apparatus of claim 1 wherein the means for interpolation further comprises a curve fit algorithm for an N×N matrix of intensity values of surrounding pixels where N is any integer value.

5. The apparatus of claim 4 wherein the curve fit algorithm comprises cubic spline interpolation.

6. A method for converting polar format radar video data comprising radar video pixels each having an associated intensity value in a polar raster display into a horizontal raster format output to a TV monitor, wherein the TV monitor includes a display screen including a plurality of pixels and a plurality of scan lines and wherein each pixel has a corresponding X,Y address, wherein the method comprises the steps of:

(a) storing the radar video pixels indexed by radial and angular coordinates;

(b) translating a display X,Y address into corresponding angular and radial coordinates including the steps of;

(i) adding by operating on (X/Y) and (1/Y) wherein for each successive scan line the constant (1/Y) is added to the previous (X/Y) to calculate a new (X/Y) and further wherein at the start of each scan line the translating means is loaded with a new (1/Y) and ((X−1)/Y), (ii) providing the square root of $[(X/Y)^2+1]$ so as to yield $R_R$, (iii) providing and scaling the arc tangent of (X,Y), (iv) multiplying $R_R$ by a scaling factor $Y_N$ to obtain $-R_R$, (v) adding offsets to $-\Theta_R$ and $-R_R$ wherein the offsets are the coordinates of the first pixel in the polar raster so as to provide $\Theta_{FFM}$ and $R_{FFM}$ values, and (vi) formatting the $\Theta_{FFM}$ and $R_{FFM}$ values as fixed point two's complement 13-bit representations wherein the 10 MSBs of each are provided as an address input to the storage means and the lower 3 bits are stored to maintain proper pipeline phasing;

(c) scanning the storage means using the translated X,Y address to access at least four radar video pixels surrounding the translated X,Y address; and (d) interpolating a radar intensity value for the translated X,Y address as a function of the intensity values associated with the surrounding pixels.

7. The method of claim 6 modified for B-Scan operation wherein first and second additional multiplexing operations are added between the multiplying step and the offset adding step wherein X(0) and Y(0) are provided to the first and second multiplexers respectively for each scan line and delta x and delta y are provided on a frame basis where delta x=$SF_B$*COS($\Theta$)

delta y=$SF_B$*SIN($\Theta$)

$\Theta$ is the angle of rotation, and $SF_B$ is the display-to-radar coordinate scale factor.

8. Apparatus for converting polar format video data comprising video pixels each having an associated intensity value in a polar raster display into a horizontal raster format output to a TV monitor, wherein the TV monitor includes a display screen including a plurality of pixels and wherein each pixel has a corresponding X,Y address, wherein the apparatus operates in a B-scan mode and comprises:

(a) means for storing the video pixels indexed by radial and angular coordinates;

(b) means for translating a display X,Y address into corresponding angular and radial coordinates and wherein the translating means further comprises:
  (i) means for initializing the X,Y coordinates on a line basis,
  (ii) means for adding delta x and delta y where delta x = $SF_B$*COS($\Theta$), delta y = $SF_B$*SIN($\Theta$), $\Theta$ is the angle of rotation, and $SF_B$ is the display-to-radar coordinate scale factor;
(c) means for scanning the storage means using the translated X,Y address to access at least four radar video pixels surrounding the translated X,Y address; and
(d) means for interpolation of a radar intensity value for the translated X,Y address as a function of the intensity values associated with the surrounding pixels.

9. A method for converting polar format video data comprising video pixels each having an associated intensity value in a polar raster display into a horizontal raster format output to a TV monitor, wherein the TV monitor includes a display screen including a plurality of pixels and wherein each pixel has a corresponding X,Y address, wherein the method comprises the steps of:
(a) storing the video pixels indexed by radial and angular coordinates;
(b) translating a display X,Y address into corresponding angular and radial coordinates, and wherein the translating step further comprises the steps of:
  (i) initializing the X,Y coordinates on a line basis;
  (ii) adding delta x and delta y where delta x = $SF_B$*COS($\Theta$), delta y = $SF_B$*SIN($\Theta$), $\Theta$ is the angle of rotation, and $SF_B$ is the display-to-radar coordinate scale factor;
(c) scanning the storage means using the translated X,Y address to access at least four video pixels surrounding the translated X,Y address; and
(d) interpolating an intensity value for the translated X,Y address as a function of the intensity values associated with the surrounding pixels.

* * * * *